US008670770B2

(12) United States Patent
Fitzgerald et al.

(10) Patent No.: US 8,670,770 B2
(45) Date of Patent: Mar. 11, 2014

(54) COMMUNICATIONS SYSTEM AND METHOD

(75) Inventors: Michael Fitzgerald, County Kerry (IE); Guy Waugh, County Kerry (IE); Richard Lord, County Cork (IE); Michael V. Godley, County Kerry (IE); Christopher Young, Dublin (IE); Liam Kenny, County Wicklow (IE); Ian Walter, Vienna, VA (US); Tadhg Crotty, County Cork (IE); Ian O'Shea, County Kerry (IE); Joseph Cahill, County Kerry (IE)

(73) Assignee: Altobridge Limited, County Kerry (IE)

( * ) Notice: Subject to any disclaimer, the term of this patent is extended or adjusted under 35 U.S.C. 154(b) by 276 days.

(21) Appl. No.: 13/124,238

(22) PCT Filed: Oct. 14, 2009

(86) PCT No.: PCT/IE2009/000071
§ 371 (c)(1),
(2), (4) Date: May 12, 2011

(87) PCT Pub. No.: WO2010/044082
PCT Pub. Date: Apr. 22, 2010

(65) Prior Publication Data
US 2011/0256864 A1 Oct. 20, 2011

Related U.S. Application Data

(60) Provisional application No. 61/136,913, filed on Oct. 14, 2008.

(51) Int. Cl.
*H04W 40/00* (2009.01)

(52) U.S. Cl.
USPC ..... 455/445; 455/403; 455/422.1; 455/414.1; 455/405; 455/560; 709/219; 709/206; 709/223; 709/224

(58) Field of Classification Search
USPC ......... 709/219, 206, 223, 224, 220, 238, 237; 455/403, 422.1, 414.1, 405, 560, 72, 455/406; 370/352, 395.21, 522, 356, 463, 370/469, 157, 400, 238, 389
See application file for complete search history.

(56) References Cited

U.S. PATENT DOCUMENTS 7,783,288 B2 * 8/2010 Waugh et al. ................. 455/429
8,437,750 B2 * 5/2013 Fitzgerald et al. ......... 455/422.1

(Continued)

FOREIGN PATENT DOCUMENTS

EP       1 850 605    10/2007
WO      03/094555    11/2003

(Continued)

*Primary Examiner* — Joseph Arevalo
(74) *Attorney, Agent, or Firm* — Jacobson Holman PLLC

(57) ABSTRACT

A method of operation of a mobile network (1) comprising network core central nodes including a switching node and at least one remote node (4, 5) linked with the central nodes via a remote backhaul communication link (3). The method performs local connection of data or voice sessions. A remote node (4, 5) extracts, from signals, information concerning said devices to populate a database, and accesses said database when deciding whether to connect the call locally. The information includes device capability information including codec capabilities of the originating and terminating devices (MS-A, B, C). A remote node alters signalling information concerning codec capabilities of at least one of the devices (MS-A, B, C) to force use of the same codecs during the session. In one example, the information is extracted from a Bearer Capability field in a Call Confirmed message sent back from the terminating device and stored in the database for use in subsequent decisions concerning local connections of sessions. The invention allows legal intercept operations and is adaptive to handover conditions.

25 Claims, 10 Drawing Sheets

(56) References Cited

U.S. PATENT DOCUMENTS

| | | | |
|---|---|---|---|
| 2006/0154660 A1* | 7/2006 | Waugh et al. | 455/428 |
| 2007/0142044 A1* | 6/2007 | Fitzgerald et al. | 455/422.1 |
| 2009/0003571 A1* | 1/2009 | Noldus | 379/201.01 |
| 2009/0215455 A1 | 8/2009 | De Jaeger | |

FOREIGN PATENT DOCUMENTS

| | | |
|---|---|---|
| WO | 2005/022779 | 3/2005 |
| WO | 2007/069229 | 6/2007 |
| WO | 2007/104743 | 9/2007 |
| WO | 2008/086825 | 7/2008 |

* cited by examiner

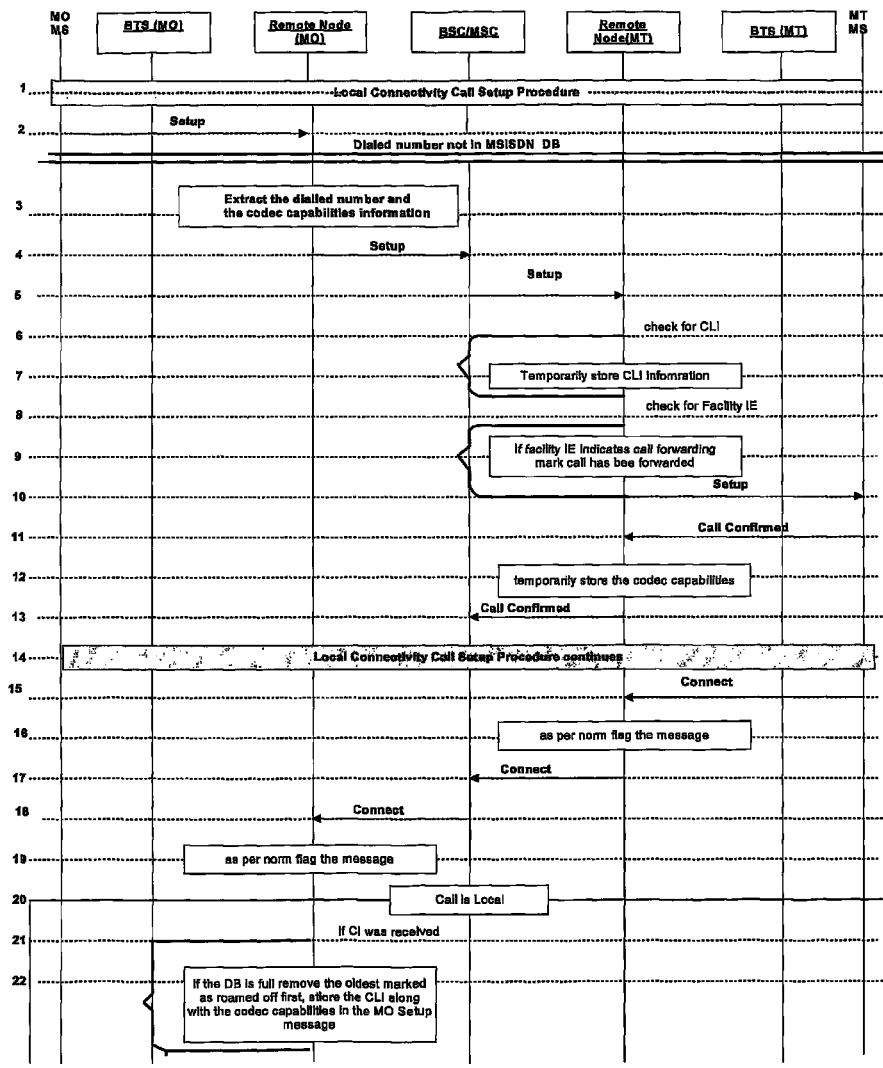
Fig. 2 Population of MSISDN Database

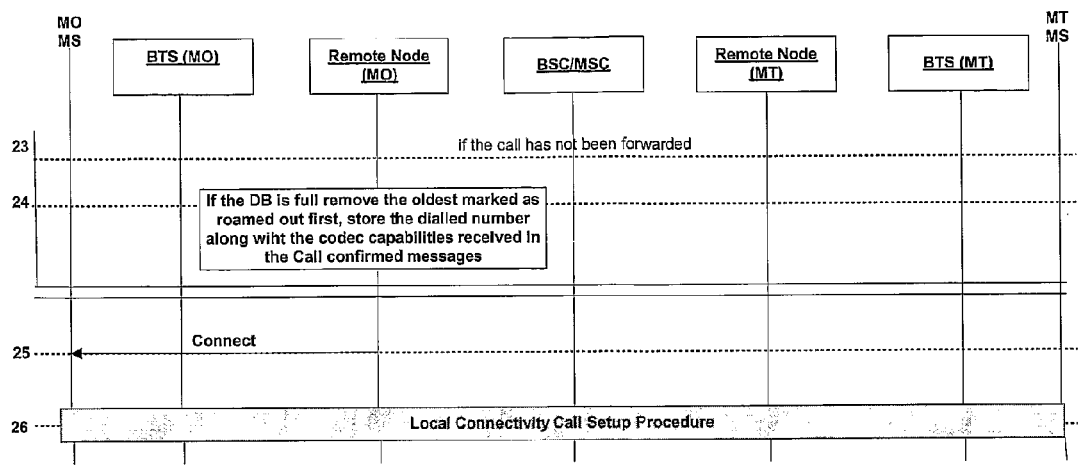
Fig. 2 Population of MSISDN Database (contd)
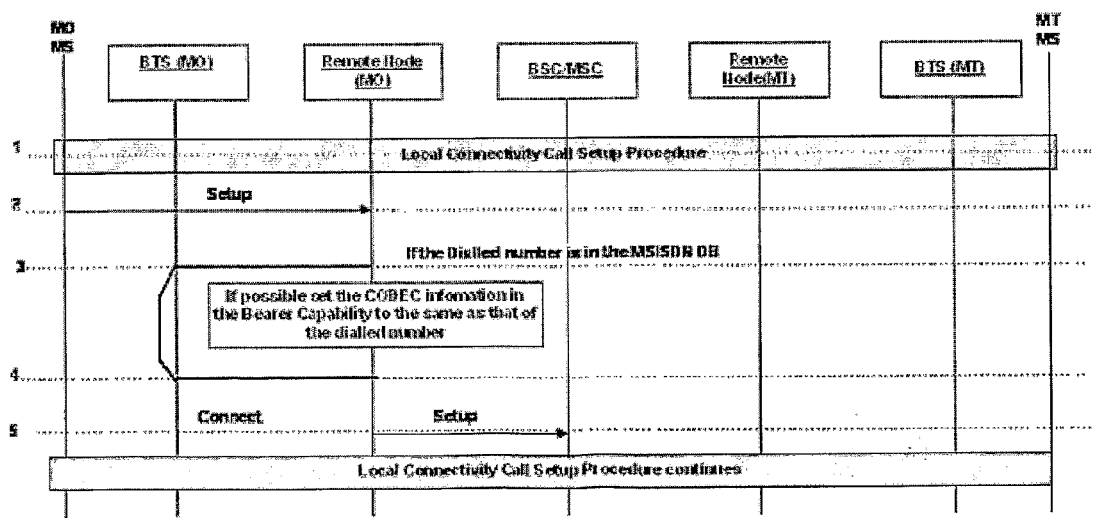
Fig. 3 Local Call Setup procedure with CODEC Matching

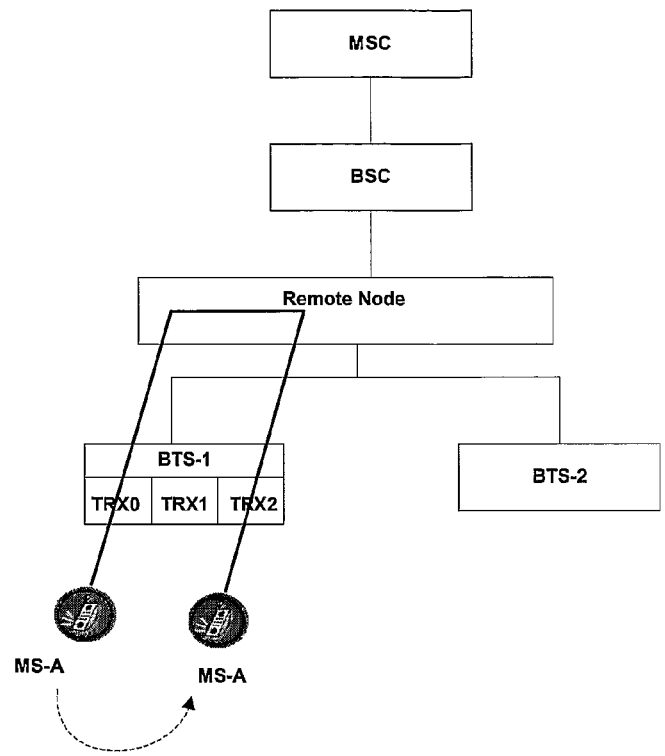
Fig. 4 Intra cell Handover
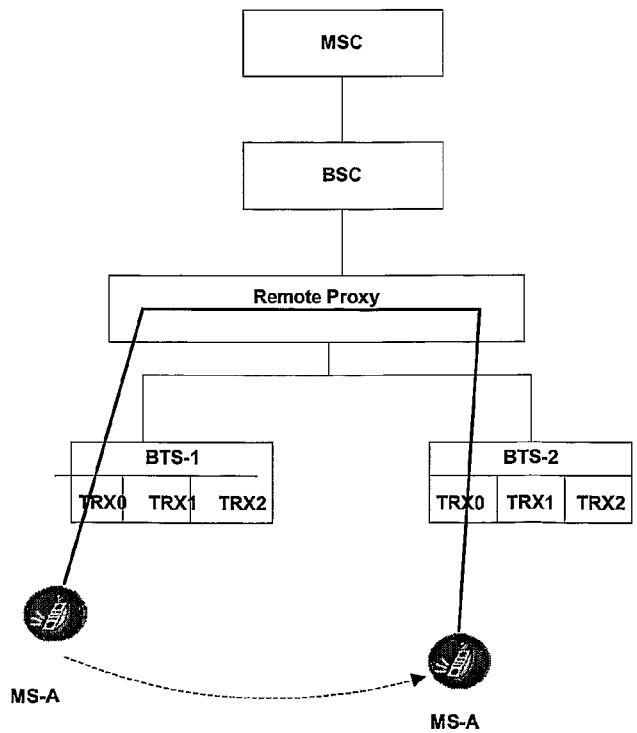
Fig. 5 Inter Cell Handover

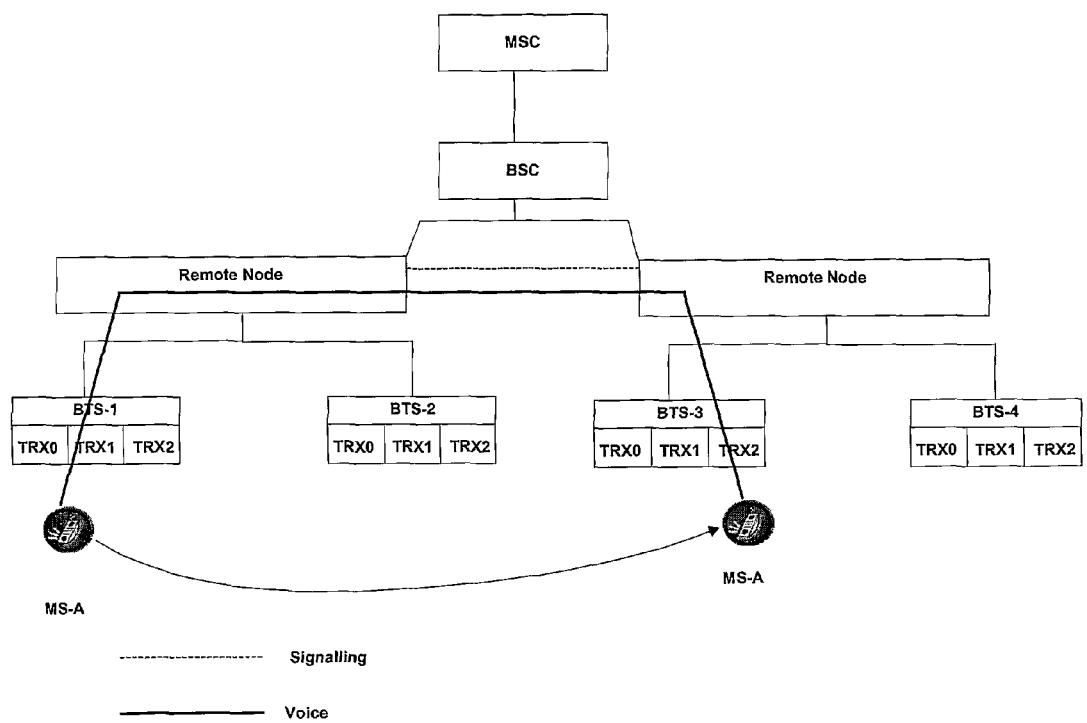
Fig. 6 Inter Cluster Handover within same Cluster Area (Option 1)

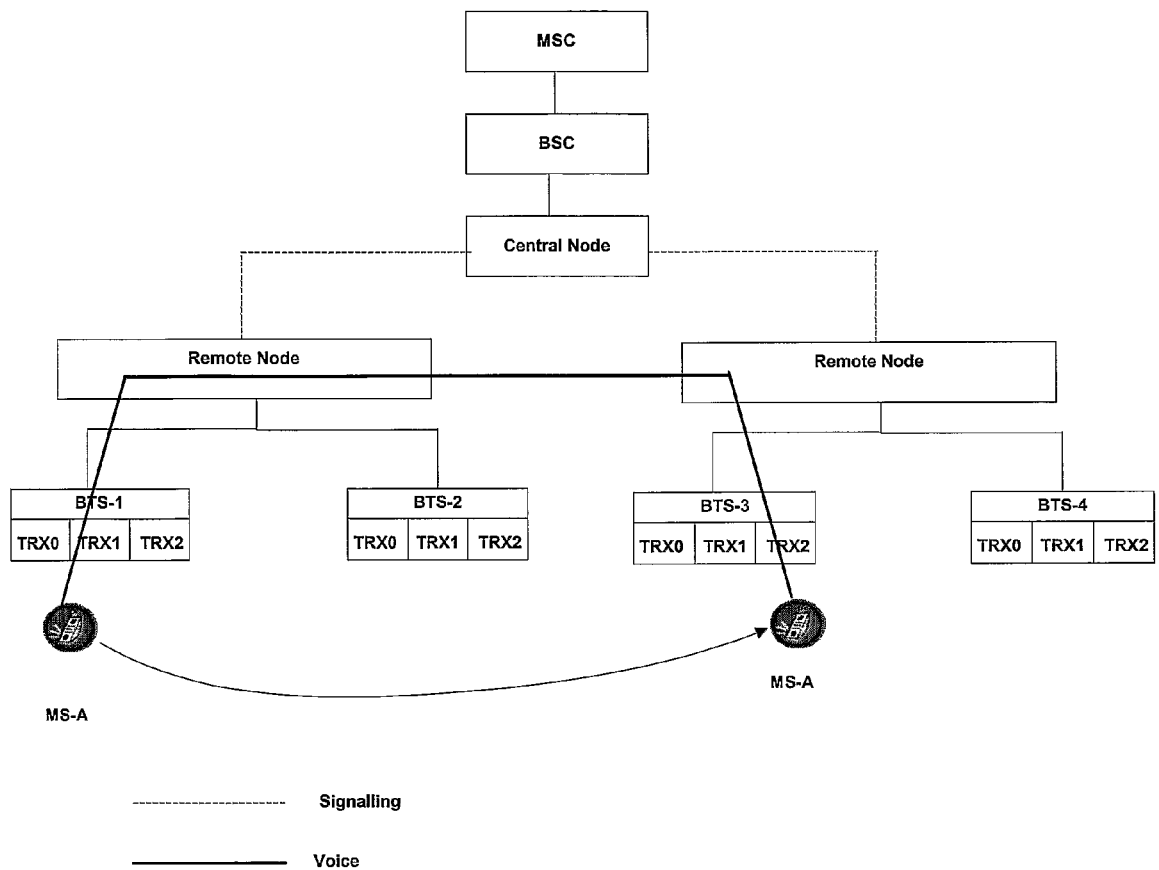
Fig.7 Inter Cluster Handover within same Cluster Area (Option 2)

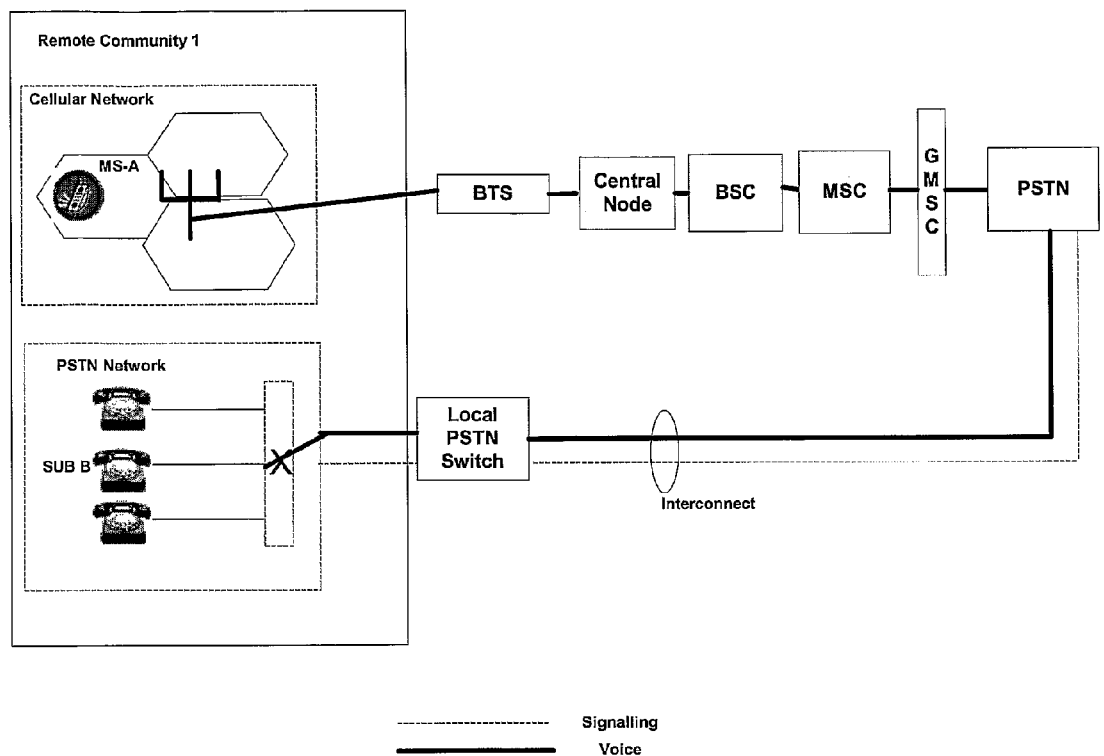
Fig. 8 Call Routing with existing network architecture

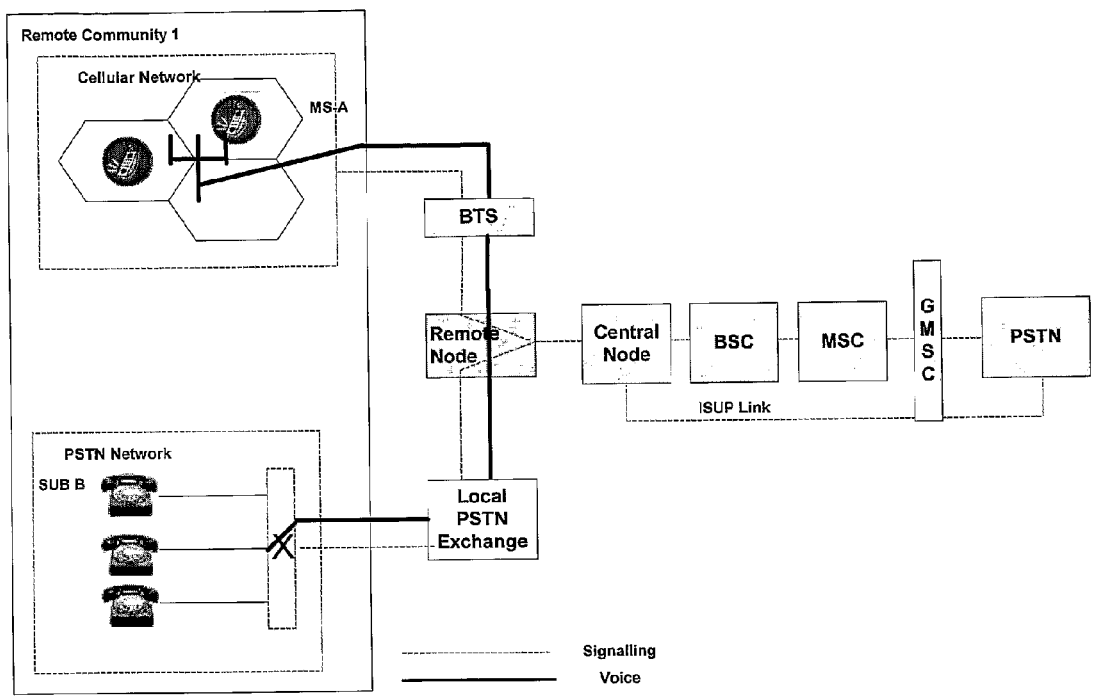
Fig. 9 Local Point of Interconnect Architecture

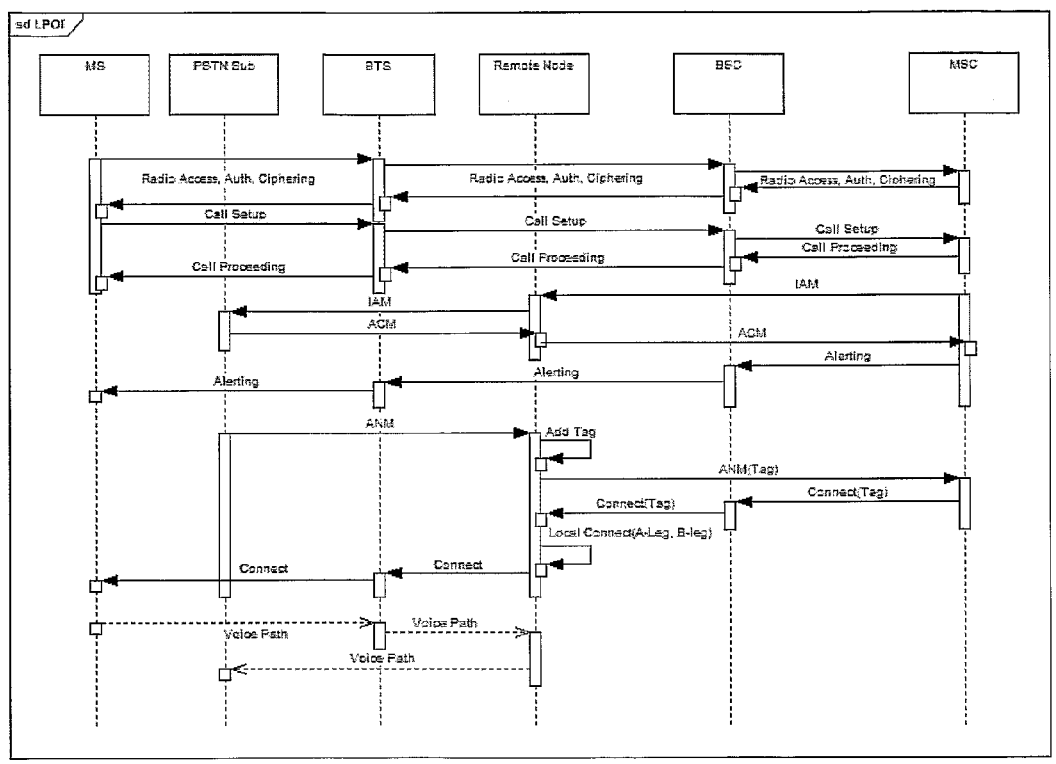
Fig. 10 MO Call to PSTN

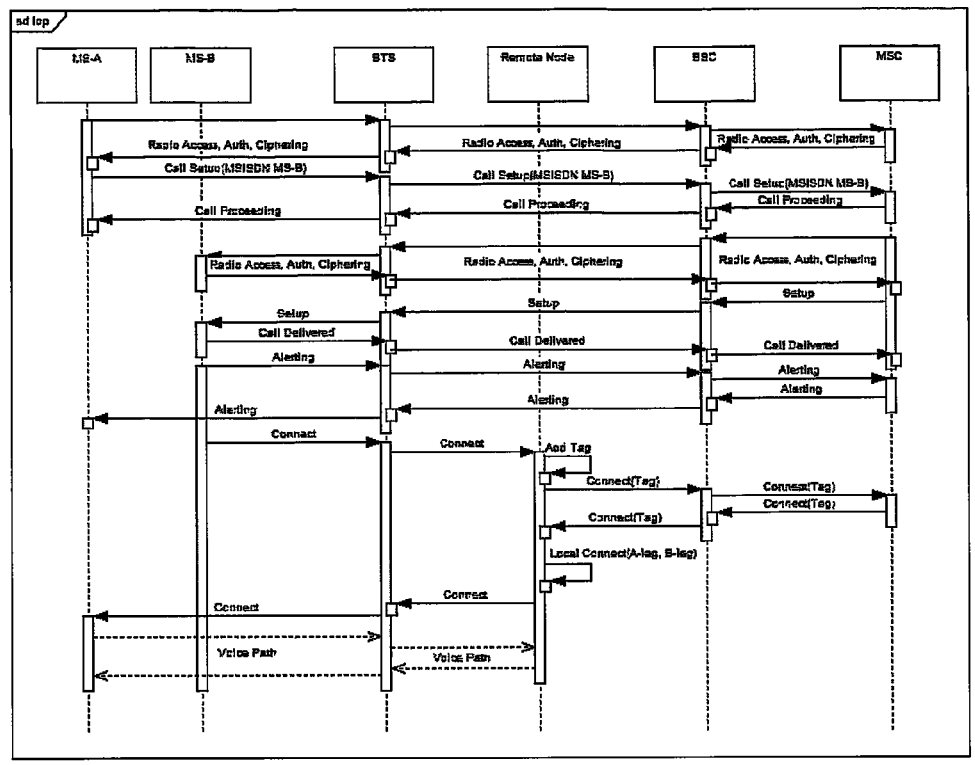
Fig. 11 Call Flow including tagging mechanism
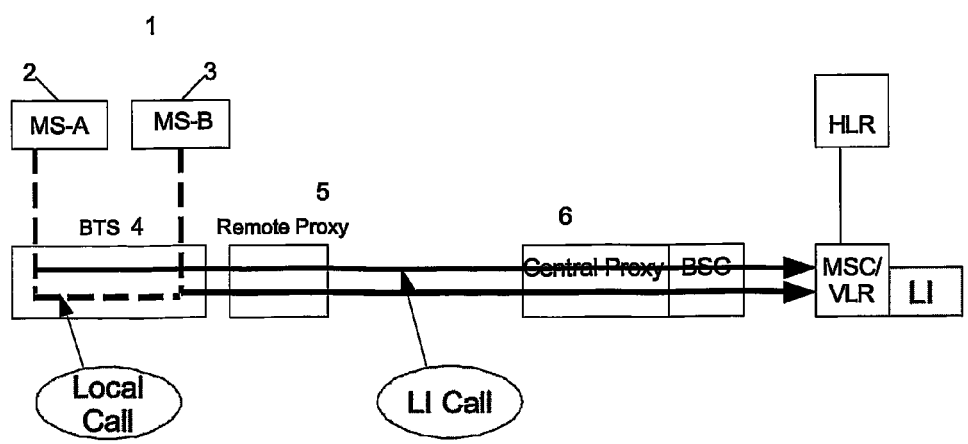
Fig. 12 Lawful Intercept

COMMUNICATIONS SYSTEM AND METHOD

This is a national stage of PCT/IE09/000071 filed Oct. 14, 2009 and published in English, claiming benefit of U.S. provisional application No. 61/136,913, filed Oct. 14, 2008, hereby incorporated by reference.

INTRODUCTION

The invention relates to management of cellular communication connections, in particular optimisation of cellular base station backhaul systems.

The communications requirements of the emerging market communities differ substantially from those of more developed economies. The percentage of traffic which remains local, for both GSM and landline is typically above 70%. Local calls are defined as calls between subscribers in the same geographical area or calls between subscribers served by the same remote telecommunications equipment. Standard GSM and fixed line switching networks have met the communication requirements for large urban communities. However, routing of non-local and local voice and data calls from remote communities is costly as both types of calls have to be routed long distances back over expensive backhaul to core infrastructure in urban areas. The routing of local calls from Remote Node to core elements in urban area and back to a remote node again is costly; and inefficient with speech quality compromised due to the distance the voice/data is transported.

Our specification WO2005/022779, describes an architecture in which a BSC is split in order to reduce backhaul requirements from remote to core nodes. Our specification WO2007/069229 describes an arrangement in which local calls do not have to be routed back to core nodes. Instead the call is routed locally, so while circuits are reserved at the core network there is no requirement for speech circuits on the backhaul to the core network elements for local calls. This is very beneficial for GSM cells in remote locations, minimising use of backhaul communication links such as costly satellite links as local voice and data calls are switched at the remote node. One mechanism in this specification involves monitoring and matching a stable international subscriber identifier (MSISDN) and a network specific subscriber identifier (IMSI). Another mechanism involves inserting a special identifier into a setup message or into a speech stream, and checking if it matches in both directions. This method is referred to in this specification as "tagging".

This invention is directed towards achieving improvements in local connection management. More specifically, the invention aims to achieve improvements in the following aspects:
  reduced processing requirement at the local nodes, and/or
  improved flexibility in terms of services which can be handled with local switching

SUMMARY OF THE INVENTION

According to the invention, there is provided a method of operation of a mobile network comprising network core central nodes including a switching node and at least one remote node linked with the central nodes via a remote backhaul communication link, the method comprising the steps of:
  a mobile device registered with a remote node originating a voice or data session with a called device,
  a remote node determining if the called device is local and, if so, connecting the session locally,
  wherein a remote node extracts, from signals, information concerning said devices to populate a database, and accesses said database when deciding whether to connect the call locally;
  wherein said information includes device capability information including codec capabilities of the originating and terminating devices; and
  wherein a remote node alters signalling information concerning codec capabilities of at least one of said devices to force use of the same codecs during the session.

In one embodiment, information is extracted from call setup signals.

In one embodiment, the information is extracted from a Bearer Capability field in a Call Confirmed message sent back from the terminating device and stored in the database for use in subsequent decisions concerning local connections of sessions.

In one embodiment, the database is populated with information concerning substantially all devices registered at the remote node.

In one embodiment, the remote node changes codec capabilities in a SETUP message to match those of a dialled MSISDN.

In one embodiment, if codec capabilities of the called device are a superset of the calling device, the Bearer Capability in a Call Confirmed message is changed to match the codec capabilities of the calling device, allowing a session to be locally connected without transcoding.

In one embodiment, the remote node removes the codec capabilities in a Call Setup message that do not match a dialled number.

In one embodiment, if the calling device has different codec preferences than that of the called device then the remote node rearranges order of a preferred codec list so that both legs match in terms of codec preferences.

In one embodiment, the remote node or a central node extract said information from said signals and update the database, and make database information available to other nodes, either remote or central.

In another embodiment, the database is also populated from an external source including a network core HLR.

In one embodiment, there are a plurality of remote nodes and there is forced codec matching and local connection between devices registered with different remote nodes.

In one embodiment, the remote node uses said database to decide on local connection without accessing any network core element such as a HLR and without needing to use a tagging mechanism.

In one embodiment, the remote node automatically breaks the local connection if it detects that a device has handed-over to a different cell which is outside of a domain of the remote node or a cluster of remote nodes, but retains local switching for inter-cell switching within said domain.

In one embodiment, a remote node performs a legal intercept by switching locally and copying session traffic back to the core network, and wherein a central node suppresses downstream traffic to the remote node.

In one embodiment, said legal intercept operations are activated according to a list of identifiers of subscribers for whom sessions are to be intercepted.

In one embodiment, said legal intercept operations are activated according to an instruction from a core network element.

In a further embodiment, a remote node is linked with a fixed network node and performs local connection involving a device in a mobile network and a device in a fixed network.

In one embodiment, the remote node accesses a list of PSTN phone lines connected to a local PSTN switch, analyses a dialled number in a setup message from the mobile device and, if it matches an entry in the list of PSTN phone lines, switches the session through a local point of interconnection.

In one embodiment, the remote node performs tagging to determine when to connect locally, by injecting an identifier in a signal and monitoring subsequent signals for the identifier, and the injection is in a signal from either the called device or the calling device.

In one embodiment, the devices have adaptive multi-rate codec capabilities, and local connection is performed using contents of a Tandem Free Operation report to indicate that both devices can use matching adaptive multi-rate codecs.

In one embodiment, the session is initially connected back to the central nodes, codec matching is performed by manipulating inband signalling exchanged between nodes, and the remote node locally connects the session after confirmation that the speech codecs on both radio links are identical In one embodiment, the remote node modifies control information in frames exchanged between a BTS and the core network to switch from a voice session to a data session and to tag data with a special identifier to implement a tagging mechanism.

In one embodiment, at least some signalling information is stored in call records, wherein analysis of the call records is performed in a learning operation to establish a relationship between identifiers such as MSIDSNs and IMSIs, and subsequently this relationship is used to decide on local connection.

In another aspect, the invention provides a communications network comprising a remote node and a core network including switching elements and a central node, wherein said remote and central nodes are adapted to perform any method defined above.

In a further aspect, the invention provides a computer program medium comprising computer readable software code embodied therein, said code being adapted to perform any method defined above when executing on a digital processor.

DETAILED DESCRIPTION OF THE INVENTION

The invention will be more clearly understood from the following description of some embodiments thereof, given by way of example only with reference to the accompanying drawings in which:—

FIGS. 2 to 4 are signal transfer diagrams for connection management;

FIGS. 4 and 5 are diagrams showing intra-cell handover and inter-cell handover respectively;

FIGS. 6 and 7 are diagrams showing inter-cluster handover within the same cluster area;

FIG. 8 is a diagram of the speech path for a call between a mobile station and a PSTN subscriber in the same remote geographical area;

FIG. 9 is a diagram showing a local point of interconnect architecture; and the routing of a call locally between mobile station and a PSTN subscriber in the same geographical area;

FIG. 10 is a signal transfer diagram for connection management for local point of interconnect;

FIG. 11 is a signal transfer diagram for connection management of a locally switched call using tagging; and FIG. 12 is a diagram illustrating lawful intercept flows.

DESCRIPTION OF THE EMBODIMENTS

Figure 1:
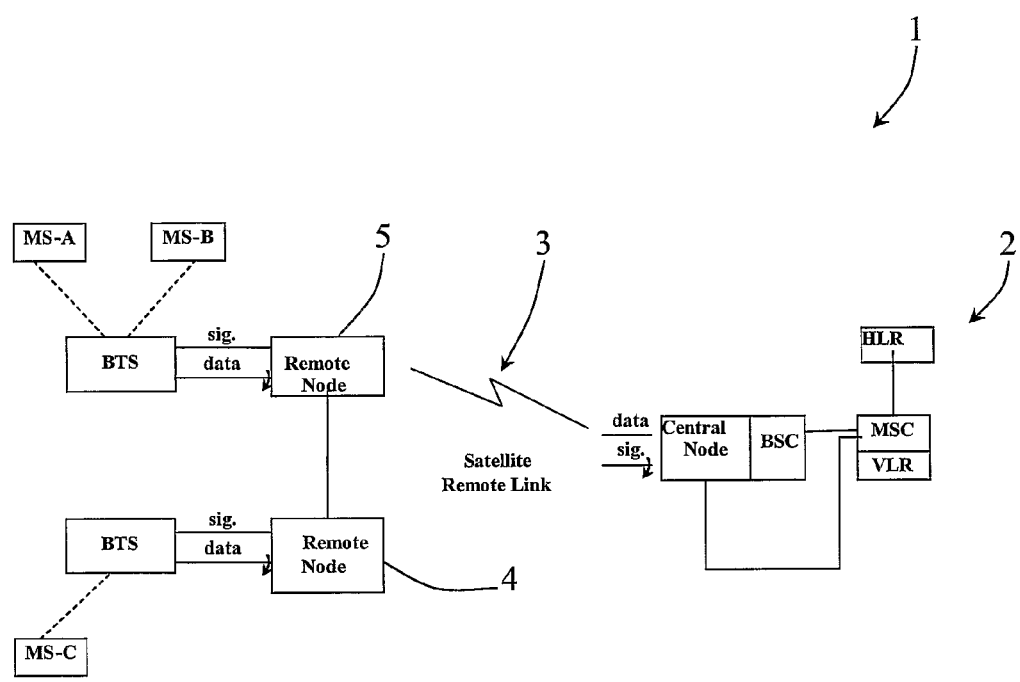
FIG. 1 is a high level block diagram illustrating components involved in a connection management method of the invention.

The following embodiment is in the context of a GSM network; however the invention can be applied to other mobile network types such as CDMA or 3G, the appropriate corresponding nodes being involved.

Referring to FIG. 1 mobile network 1 has a core 2 with a central nods and network elements including a BSC, an MSC, a VLR, and HLR. Remote cells are linked by a backhaul link 3, and two remote nodes 4 and 5 are shown, each linked with a BTS. The cells are in a remote geographical location and for illustrative purposes are illustrated comprising mobile stations MS-A, MS-B, and MS-C. There are two BTSs, each linked to a local node, called "remote nodes" as they are remote from the core network elements. The remote nodes are inter-linked and one of them interfaces to a satellite remote link, and has functionality that intercepts, decodes, and in some cases modifies the signalling between the remote site and the core network in order to identify and modify call characteristics requested by mobile stations, identify related calls and manage related switching functions and features. The nodes perform local switching of calls. Functionality could also be integrated into existing cellular network elements.

Each remote node handles BTS-BSC signalling, but the voice and data channels are looped back for local switching. All mobile-to-mobile voice calls in GSM networks are coded and decoded at two stages in the core network. This is called transcoding. This transcoding can cause delay. This feature will remove unnecessary coding and decoding of local calls at the core nodes improving the overall quality of the voice calls.
Handling of Supplementary Services.

Certain supplementary services such as multi-party calling cannot be used if a call is being switched locally since the speech packets are not sent back to the MSC. When such a supplementary service is invoked by either one of the mobiles the remote node hands the call back to the core network and releases the local connection.
Local Switching Procedure with Coder/decoder ("codec") Matching To minimise processing requirements at the remote nodes it is preferable that both mobile devices being switched locally use the same speech coder. In this way the speech packets from one device can be switched directly to the other device and no transcoding of the speech packets is necessary. This is called transcoder-free operation of local calls. This improves the speech quality of the call. The invention avoids the potential problem where some local calls may incur transcoding steps because of different codec capabilities or preferences of the mobile device. These capabilities are called codec capabilities and are included in call setup signalling messages. If the codec preferences for the calling and the called subscribers are different, then a call may not be locally switched between these subscribers; but may incur a transcoding step increasing delay and degrading voice quality.

This invention also overcomes limitations associated with using transcoder-free operation in standard 2G networks, and introduces the capability to switch calls locally between mobile stations irrespective of their codec preferences Referring to FIG. 1, the remote nodes force match the codecs of MS-A and MS-B on both legs of the call, thus allowing the call to be locally switched through the BTS, thus reducing backhaul requirements and improving voice call quality while implementing transcoder-free operation for locally switched calls. This is achieved by modifying the set-up signalling so that MS-A and MS-B are forced to use the same coder/decoder, the codec used being one which is supported by both MS-A and MS-B and not necessarily the best codec for speech quality. If it is not possible for both mobiles to use the same codec then the call is handed back to the core network and is not switched locally. Alternatively, transcoding software or hardware can be used in the remote node to adapt the speech packets from one mobile to a format which can be used by the other mobile.

In conventional mobile networks, all mobile-to-mobile calls are transcoded twice in the core network during a call. This can compromise the overall quality of the call. This invention improves the overall speech quality of calls while also ensuring that there is no backhaul delay as the call is locally switched, and an improvement in voice quality of call as no transcoding of speech packets will take place when codec forced matching is in place. The invention also reduces the equipment costs for telecom operators as there is less backhaul transmission required when calls are locally switched.

In the GSM cellular system the main parameters used to identify a subscriber are the MSISDN (Mobile Subscriber International Subscriber Directory Number) and IMSI (International Mobile Subscriber Identity). A subscriber may port to another network, but the MSISDN will stay the same but the IMSI will change as it contains the operator's network code. The relationship between a subscriber's IMSI and MSISDN is maintained in the HLR.

When a GSM subscriber initiates a call, the MS sends a SETUP message to the MSC, the MS provides the MSC with a set of parameters describing the service required, for example, speech and the type of connection that is required for the voice service, for example FR, EFR, HR, and AMR. The parameter that specifies the type of connection is called the Bearer Capability (BC); it describes the basic requirements of the radio channel required by the calling subscriber. This parameter in the SETUP message is manipulated in the method of the invention; it is stored in the remote node, and is used in the codec matching.

Population of Local Storage with Subscriber Information

Referring again to FIG. 1 in a conventional GSM system, when subscriber A calls subscriber B then subscriber A dials the MSISDN of subscriber B. Referring to FIG. 2 a SETUP message (SETUP) contains the dialled MSISDN of the MT MS and the Bearer Capability (speech Channel requirement contains codec capabilities of the MO MS. This setup message is analysed in the remote node, and the dialled MSISDN of the MT MS is extracted as well as the codec capabilities of the MO MS. The unmodified SETUP message is passed through the BTS, the BSC, and the MSC which then routes the call based on the dialled number (MSISDN of the MT MS). The SETUP Message is sent to MT MS and the MSISDN of the MO MS is retrieved from the message (CLI). The CODEC capabilities of the MT MS are extracted from the Bearer Capability Field in the Call Confirmed message. The local connectivity call setup procedure continues. The call is determined to be local by using the tagging mechanism (insertion of special identifier and subsequently matching) in the Connect message and the MSISDN DB is populated with the MSISDN of the MO MS (received in CLI of MT Setup message) along with the corresponding codec capabilities (received in MO Setup message) and the MSISDN of the MT MS (received in the MO Setup message) along with the corresponding codec capabilities (received in the MT Call confirmed message) as illustrated in FIG. 2, at the remote node. The procedure outlined above occurs when a MS makes a first call attempt at the remote site.

Subsequent Call Handling

The MSISDN DB is used at call setup to match the codecs of the two mobile devices registered at the same nodes, enabling local switching of the call without remote transcoders.

The remote node reads the dialled number from the SETUP message in a call setup. If that dialled number is in the MSISDN DB it will check the corresponding codec capabilities. If the codec capabilities of the calling mobile are greater than those of the called mobile then the remote node will modify the SETUP message in the following way:

Remove the codec capabilities that do not match the dialled numbers.

Rearrange the order of preferred codec list so both legs match in terms of codec preferences. If the codec capabilities of the called mobile are a superset of the calling mobile, then the codec matching can also be performed; in this case the Bearer Capability in the Call Confirmed message is changed to match the codec requirements of the Calling Party.

The modified MO Setup message is sent to the MSC. Normal local connectivity call setup procedure continues.

Referring to FIG. 3, the modified SETUP message is sent up to the MSC where normal local call connectivity continues. If the remote node (MO) does not receive expected information in the signalling message from the terminating side, the call will either not be locally switched or a transcoding step in remote node is required.

Handling of Roamed Out Subscribers

The invention also provides for handling roamed-out subscribers in the MSISDN DB. When a MS moves outside the coverage of a remote node calls cannot be locally switched to this MS. The above local setup procedures will still apply and if codec information for this subscriber still exists, then this information will be used in the call setup. However if the call is not identified as a local call from the MT side, the call will not be locally switched and the entry in the MSISDN table will be purged.

Codec matching functionality will also recognize that a subscriber has not accessed the remote node for a defined period of time; this MSISDN entry will be removed from the MSISDN DB to avoid subsequent call setup signalling modification.

Handover Handling.

As a mobile device moves while a voice call is in progress, the call may be transferred (handover) from one cell to another due to poor quality, poor received signal or better signal from a neighbouring cell. The MSC/BSC makes the decision when a handover from one radio resource to another radio resource in the same cell or to another cell should take place. If the handover does not take place the call may drop. When a call is being switched locally a MS may be required to hand over to another cell or to another radio resource within the same cell. The remote node monitors all handover related signalling for all locally switched calls with the aim of maintaining local switching of the call if possible.

Intra-Cell Handover

Consider MS-A and MS-B are on a local call served by a BTS. The BSC is monitoring the received signal and quality levels from both MS-A and MS-B. If either MS-A or MS-B experiences a poor signal or bad quality connection, then the BSC may order MS-A or MS-B to hand over to a new radio channel in the same BTS. This is called intra-cell handover. When a handover to another radio resource in the same cell occurs the remote node monitors the handover related signalling from the BSC and recognises the target channel to which the mobile is about to switch and establishes a connection to the new channel so that the call is not interrupted. The call remains locally switched. In the example shown in FIG. 4, only MS-A is considered, and only one leg of the call is shown. The BSC has ordered an intra cell handover, so MS-A moves from a radio channel on TRX0 to TRX2 in the same cell. The call remains locally switched.

Inter-Cell Handover and Handover within Remote Node Area

Referring again to FIG. 1, consider MS-A and MS-B are on a local call served by the BTS. The BSC is monitoring the received signal and quality levels from both MS-A and MS-B. If either MS-A or MS-B experiences a poor signal or bad quality connection, then the BSC may order MS-A or MS-B to handover to a new radio channel in a new BTS. If the handover is to another cell which is under control of the same remote node or to a cell which is under control of a peer node then the remote node monitors the handover related signalling and recognises the target cell and channel to which the mobile is about to switch and establishes a connection to the new channel either directly or through the peer node so that the call is not interrupted. The call remains locally switched. In the example shown in FIG. 5 only MS-A is considered, and only one leg of the call is shown. The BSC has ordered an inter-cell handover so that MS-A moves from a radio channel on TRX 0 on BTS-1 to a radio channel on TRX 0 on BTS-2.

Inter-Cluster Handover within Same Cluster Domain

Consider MS-A and MS-B are on a local call served by the BTS. The BSC is monitoring the received signal and quality levels from both MS-A and MS-B. If either MS-A or MS-B experiences a poor signal or bad quality connection, then the BSC may order MS-A or MS-B to hand over from the BTS to a new radio channel in a new BTS. If the handover is to another cell which is under control of the different remote node then the remote node monitors the handover related signalling and recognises the target cell and channel to which the mobile is about to switch and establishes a connection to the new channel. The call remains locally switched. In the example shown in FIG. 6 only MS-A is considered, and only one leg of the call is shown. The BSC has ordered an inter-cell handover so that MS-A moves from a radio channel on TRX 1 on BTS-1 to a radio channel on TRX 2 on BTS-3. In the example shown in FIG. 7 only MS-A is considered, and only one leg of the call is shown. In this case the central node monitors the handover-related signalling. The BSC has ordered an inter-cell handover so that MS-A moves from a radio channel on TRX 1 on BTS-1 to a radio channel on TRX 2 on BTS-3.

Inter Cell Handover and Handover Outside the Remote Nodes

Consider MS-A and MS-B are on a local call served by the BTS. The BSC is monitoring the received signal and quality levels from both MS-A and MS-B. If either MS-A or MS-B experiences a poor signal or bad quality connection, then the BSC may order MS-A or MS-B to handover to a new radio channel in a new BTS. If the handover is to another cell which is not under control of the same remote node or to a node that does not have local switching functionality, then the remote node hands the call back to the core network and releases the local connection. The call is not interrupted but is not locally switched anymore.

Local Point of Interconnect

This embodiment minimises the requirement for transmission backhaul for a call between a fixed line subscriber and a mobile subscriber when a remote node is connected directly to the PSTN.

Consider in FIG. 8 a remote community that has a fixed line service as well as standard mobile service. If fixed line subscriber B makes a voice call to MS A, then the voice call is routed from the local PSTN switch back to national PSTN network over expensive backhaul, usually satellite. The call is then switched through the GSM network over the backhaul to the MS-A. The voice path is highlighted by the heavy bold line in FIG. 8.

Referring to FIG. 9, in this embodiment the call is switched locally at the remote site, eliminating the need to route voice traffic back to the core network; reducing backhaul requirements while maintaining the same quality of service to the end user. The voice path is highlighted with a bold line. There is local switching of MO voice to a local PSTN through a local point of interconnect, and local switching of MT voice from the local PSTN through a local point of interconnect.

In another embodiment, the local switching functionality residing on the remote node contains a list of the all the PSTN phone lines connected to local PSTN switch. The remote node analyses the dialled number in the setup message and if it matches an entry in the list of PSTN phone lines, at remote node, the call can be switched through the local point of interconnection.

Mobile Originated Local Call

Referring to FIGS. 9 and 10 consider MS-A at a remote node makes a call to the fixed line subscriber, SUB-B. At the setup phase of the MO Call the remote node intercepts a call setup message and injects an identifier into the user-to-user filed. This message is forwarded to the MSC/BSC which then forwards the message to the PSTN network. When the incoming message for the terminating leg of the call arrives in the remote node, it will contain the same identifier which is matched to the identifier in the previous setup message indicating that the call is local. The remote node connects the speech path locally and performs the appropriate transcoding from 64 k PCM to the GSM codec. The central node terminates the speech circuits from the PSTN. The MSC is still in control of the call and handles supervision, billing and O&M as normal.

Mobile Terminated Local Call

Referring to FIG. 9, consider when the Sub-B subscriber makes a call to MS-A. The remote node intercepts the IAM message from the PSTN switch and injects an identifier into the user-to-user field. The message is forwarded to the MSC which then routes the call to MS-A. When the incoming message for the terminating leg arrives in the remote node, it will contain the same identifier which is matched to the identifier in the IAM message indicating that the call is local.

The remote node connects the speech path locally and performs the appropriate transcoding from the 64 k PCM to the GSM codec. The central node terminates the speech circuits from the PSTN. The MSC is still in control of the call and handles supervision, billing and O&M as normal.

The following embodiment is in the context of a GSM network; however the invention can be applied to other mobile network types such as CDMA or 3G, the appropriate corresponding nodes being involved.

Tagging

The tagging mechanism provides the functionality to route calls locally while continuing to manage calls and services from the central feature-rich and typically more reliable switches of the core network. This embodiment describes the insertion of remote node information into the CONNECT message.

Tagging Using Call Setup Message

A mobile call sequence involves the exchange of signalling messages between the mobile station, remote nodes, and central nodes. The tagging mechanism inserts specific information into some of these messages that will allow nodes in the network make the decision that a call can be locally switched. This tagging method is implemented by injecting information into optional fields in call setup messages. A number of messages allow additional signalling information to be inserted into optional fields. The example in FIG. 11 considers one message in the sequence of setting up a call, the CONNECT message However, this methodology could be applied to a number of other call setup messages.

Considering the CONNECT message, which is sent towards the end of a call setup sequence. When the B Subscriber answers the call, a MT CONNECT message is sent back to the remote node. The remote node inserts a remote node identifier into the MT CONNECT message. The MT Connect message is passed onto the MSC, the MSC converts this message to an MO Connect message for sending to the MO MS and the tag is transferred to the MO Connect message. On reception of the MO Connect message the remote node checks the tag and determines that the call is local and extracts the details of the MT leg of the call and the call is locally switched.

This tagging mechanism can also be implemented by inserting information into the following messages: ALERTING, PROGRESS, SETUP.

This embodiment can also be implemented by manipulating Inband frames exchanged between the BTS and the central nodes during call setup. The remote node modifies the control information in frames exchanged between BTS and core nodes from type "Speech services" to "Data services". The remote node also adds the remote node identifier in the data message. This message is passed transparently through to the remote node serving the B-Subscriber. If this message contains the remote node identifier of that remote node, then the call can be locally switched.

In another embodiment, tagging works with Tandem Free Operation (TFO) to locally switch AMR to AMR calls. Adaptive multi-rate (AMR) codecs on modern handsets enhance the speech quality of voice calls. The penetration of Mobile Handsets with AMR codec is increasing in mobile networks. TFO functionality eliminates unnecessary transcoding of AMR to AMR calls using in-band signalling exchanged between core nodes in GSM networks. Tagging mechanisms described above have manipulated Call Setup messages to locally switch the call. In this embodiment, the voice call is initially connected back to the core nodes; TFO functionality then matches codecs using standard inband signalling exchanged between core nodes. The remote node locally switches the call after confirmation that the speech codecs on both radio links are identical. The tagging functionality could reside on the remote or the central nodes.

Lawful Intercept

Lawful Intercept ("LI") is a requirement placed on telecommunications service providers to provide legally sanctioned official access to private voice and data communications. Lawful Intercept in existing PSTN networks is done by a "physical tap". However, GSM networks and VOIP technology has enabled the mobility of the end user. The requirement for the LI system is that it must provide transparent interception of specified traffic only and the subject must not be aware of the interception.

Referring to FIG. 12, when a call is being switched locally in the remote node the speech or data packets are exchanged locally between the mobiles and are not sent to the core network to save backhaul bandwidth. When required by legal authorities the remote node must send all speech and data packets to the core network (MSC) for interception. To preserve the enhanced conversation quality of local switching the remote node continues to switch packets locally and replicates all packets towards the MSC while packets on the downlink are suppressed. Activation of legal intercept at the remote node can be on a call-by-call basis using a signal from the MSC, or can be activated for all subscribers on a list downloaded to the remote node or can be activated manually by O&M command. The lawful intercept ("LI") functionality in remote node operates without affecting normal service to other local subscribers. The intercepted party will not be aware of inspection. Also, SMS and data can be intercepted.

Considering FIG. 12, to facilitate the legal interception of the local voice call between MS-A and MS-B, the remote node replicates the voice stream between MS-A and MS-B and passes this duplicated voice stream up to the central BSC. The remote node replicates the local speech patterns of the voice call that is to be intercepted. These speech patterns will be forwarded to the BSC and MSC/VLR to be intercepted by legal authorities.

Call Record Analysis to Match MSISDN/IMSI

This embodiment provides the functionality to determine whether a voice/data call or SMS should be locally switched. The functionality determines a relationship between a mobile device's MSISDN and IMSI by analysing call records that are generated for each call. If this link is established, then the calls could be switched locally based on this association.

For every MO Call the following information is available in the call record:
Call Type=Mobile Originated voice call
Timestamp=Time at which the call was initiated by the caller.
Originator Id=IMSI of the originator
Destination Id=MSISDN of the called party
Success flag=Indicates if the call was answered
Duration=Duration of the conversation
Set-up time=Time taken between initiation of the call and the called party answer.

For every MT Call the following Information is available in the call record:
Call Type=Mobile Terminated voice call
Timestamp=Time at which the network initiated the call to the called party
Originator Id=MSISDN of the originator
Destination Id=IMSI of the called party
Success flag=Indicates if the call was answered
Duration=Duration of the conversation
Set-up time=Time taken between initiation of the call by the network and the called party answer.

By examining these call records and applying rules it is possible to derive the IMSI to MSISDN relationship with a high degree of accuracy. This information in turn can be used by the remote nodes to distinguish between local and non-local calls. The algorithm runs at all time processing information from signalling analysis and generates a database with a list of IMSIs and their possible MSISDNS. For example two calls (one MO and the other MT) which start at the same time and have the same duration in the same cell could be two halves of the same call.

The steps of the algorithm would be as described below;
(i) For all answered mobile-originated call records, check for a mobile-terminated call record generated at the same time (plus or minus a configurable time, typically 1 second) with the same duration (plus or minus a configurable time, typically 1 second).
(ii) For pairs of call records identified in step 1 above, check that the start time (timestamp) plus the set-up time of both records are the same (plus or minus a configurable time, typically 1 second).
(iii) For pairs of call records identified and validated in step 2 above, check that the dialled numbers are valid, i.e. call is to another mobile. This is done by comparing the first few digits to a list of known mobile prefixes of prefixes to be excluded such as service numbers.

(iv) For pairs of call records identified and validated in step (iii) above, extract the caller's IMSI from the MO record and the caller's IMSI from the MT record. Check that the mobile country code (MCC) of the IMSI corresponds with the international prefix of the MSISDN.

(v) For pairs of call records identified and validated in step 4 above, extract the called party's MSISDN from the MO record and the called party's IMSI from the MT record. Check that the mobile country code (MCC) of the IMSI corresponds with the international prefix of the MSISDN.

(vi) For each IMSI, record the corresponding MSISDN found using the method described above.

The procedure described above results in a list of IMSIs with their associated MSISDNs with a high probability of accuracy. To further guarantee the accuracy of these associations the procedure is repeated for several calls concerning these mobiles before all erroneous results can be eliminated.

For each IMSI, a database is maintained with the corresponding MSISDN (or MSISDNs if more than one match is found) and a counter for the number of times a match has been detected. Once the counter for a given MSISDN reaches a configurable threshold (say 5) then the match is considered to be correct. In other words if the same MSISDN is found for the IMSI 5 times it is considered to be the correct MSISDN. Subsequent calls to this MSISDN can now be locally switched as the algorithm has determined this subscriber is on site.

This relationship is used to detect local calls which can then be switched locally. When calls are switched locally between mobiles using this method, the duration of these calls are monitored and if the duration is less than a configurable value (say 10 seconds) it is assumed that the relationship (MSISDN to IMSI) is incorrect and the relationship is deleted from the database. What is happening here is that the wrong mobiles have been connected together and as a result the call is unusually short. After a configurable period of time (say 3 days) unused relationships are deleted from the database. This is to cater for mobiles which have for example changed SIM cards or ported to another network.

The call records could be generated by remote/central nodes. In an another embodiment, the same CDR information can be retrieved real time from the MSC/IN node or from real time monitoring of a GSM Interface. The invention is not limited to the embodiments described, but may be varied in construction and detail.

The following summarises some of the main advantages of the invention in various embodiments:

The dialled MSISDN is extracted as well as the codec capabilities of the MO MS. Information extracted is stored in local storage in an MSISDN DB.

Codec capabilities are extracted from the Bearer Capability Field in the Call Confirmed message sent back from the MT MS and stored in the remote node MSISDN database for use in subsequent call handling.

The MSISDN DB stores information for subscribers registered at that node.

The remote node reads the dialled number from the SETUP message in a call setup. If that dialled number is in the MSISDN database of the remote node, it will check the codec capabilities from the database of the called party. A remote node changes the codec capabilities in the SETUP message to match that of the dialled MSISDN. If the codec capabilities are a superset of the calling mobile, the Bearer Capability in the Call Confirmed message is changed to match the codec requirements of the Calling Party allowing call to be locally switched without transcoding.

If the calling mobile has greater codec capabilities than that of the dialled mobile then the remote node will remove the codec capabilities in the Call Setup message that do not match the dialled number. Also, the remote node rearranges the order of preferred codec list so both legs match in terms of codec capabilities. The remote node sends modified uplink Setup message to the MSC. Mobile devices with the same codec preferences are locally switched, and also, devices with different codec preferences are locally switched Local switching applies for new calls, calls handed into a cell, or calls that have been modified.

If codec matching functionality recognizes that a subscriber has not accessed the remote node for a period of time, an MSISDN entry will be removed from the MSISDN DB to avoid subsequent call setup signalling modification.

A remote node monitors handover-related signalling and maintains local switching of an intra-cell handover. A remote node monitors handover-related signalling and maintains local switching of an inter-cell handover within the same remote node. A remote node monitors handover-related signalling and maintains local switching of an inter-cell handover within the same cluster of remote nodes. A remote node monitors handover signalling and releases a locally-switched call when handover is to node that does not support local switching.

The invention provides functionality to existing GSM/PSTN nodes to allow local switching to/from PSTN calls between a remote node connected to a PSTN.

A remote node injects an identifier into the setup message from mobile to PSTN during call setup. A remote node monitors the incoming signal for the same identifier which is matched to the identifier in the previous setup message indicating that the call is local. In one example, the remote node connects the speech path locally and performs the appropriate transcoding from 64 k PCM to the GSM codec. The central node terminates the speech circuits to the PSTN. For a call from PSTN to mobile subscriber, the remote node intercepts the IAM message from the PSTN switch and injects an identifier into the user-to-user field. The incoming message for the terminating leg arrives in the remote node, it will contain the same identifier which is matched to the identifier in the IAM message indicating that the call is local.

Tagging may be implemented by manipulating Inband frames exchanged between remote nodes and the core network. Local AMR to AMR calls can be locally switched using tagging and TFO.

For lawful interception, the remote node replicates all speech and data packets to the core network (MSC) when a call is switched locally And suppresses downstream traffic from the core network A remote or central node extracts call relevant information for all calls and SMSs, and from remote/central nodes and stores information in proprietary call records. Analysis of call records is performed to derive a relationship between MSISDN and IMSI for all calls. Relationship between MSISDN and IMSI is stored in a database. The database is maintained of MSISDN/IMSI relationships and is checked during call setup to check if a call can be locally switched. The relationship between the MSISDN and IMSI is established from call records, but is not used in the call setup, but for statistical purposes.

The invention is not limited to the embodiments described, but may be varied in construction and detail.

The invention claimed is:

1. A method of operation of a mobile network comprising a network core having nodes including a switching node and at least one remote node linked with the network core nodes via a remote backhaul communication link, the method comprising the steps of:
   a mobile device registered with the at least one remote node originating a voice or data session with a called device,
   the at least one remote node determining whether the called device is local and, if so, connecting the session locally,
   the at least one remote node extracting, from signals, information concerning said devices to populate a database, and accessing said database when deciding whether to connect the call locally, wherein said information includes device capability information including codec capabilities of the originating and terminating devices;
   the at least one remote node altering signalling information concerning codec capabilities of at least one of said devices to force use of the same codec during the session, and
   the at least one remote node handing back the session to one of said network core nodes without switching it locally if it is not possible for the originating and terminating devices to use the same codec;
wherein the at least one remote node performs a legal intercept by switching locally and copying session traffic back to one of said network core nodes, and wherein one of said network core nodes suppresses downstream traffic to the at least one remote node; and
wherein said legal intercept operations are activated according to an instruction from one of said network core nodes.

2. The method as claimed in claim 1, wherein information is extracted from call setup signals.

3. The method as claimed in claim 2, wherein the information is extracted from a Bearer Capability field in a Call Confirmed message sent back from the terminating device and stored in the database for use in subsequent decisions concerning local connections of sessions.

4. The method as claimed in claim 1, wherein the database is populated with information concerning substantially all devices registered at the at least one remote node.

5. The method as claimed in claim 1, wherein the at least one remote node changes codec capabilities in a SETUP message to match those of a dialled MSISDN.

6. The method as claimed in claim 1, wherein if codec capabilities of the called device are a superset of the calling device, the Bearer Capability in a Call Confirmed message is changed to match the codec capabilities of the calling device, allowing a session to be locally connected without transcoding.

7. The method as claimed in claim 6, wherein the at least one remote node removes the codec capabilities in a Call Setup message that do not match a dialled number.

8. The method as claimed in claim 1, wherein if the calling device has different codec preferences than that of the called device then the at least one remote node rearranges order of a preferred codec list so that both legs match in terms of codec preferences.

9. The method as claimed in claim 1, wherein the at least one remote node or at least one of said network core nodes extracts said information from said signals and updates the database, and makes database information available to other nodes, either remote or network core.

10. The method as claimed in claim 1, wherein the database is also populated from an external source including a network core HLR.

11. The method as claimed in claim 1, wherein there are a plurality of remote nodes and there is forced codec matching and local connection between devices registered with different remote nodes.

12. The method as claimed in claim 1, wherein the at least one remote node uses said database to decide on local connection without accessing any network core node and without needing to use a tagging mechanism.

13. The method as claimed in claim 1, wherein the at least one remote node automatically breaks the local connection if it detects that a device has handed-over to a different cell which is outside of a domain of the at least one remote node or a cluster of remote nodes, but retains local switching for inter-cell switching within said domain.

14. The method as claimed in claim 1, wherein said legal intercept operations are activated according to a list of identifiers of subscribers for whom sessions are to be intercepted.

15. The method as claimed in claim 1, wherein the at least one remote node is linked with a fixed network node and performs local connection involving a device in a mobile network and a device in a fixed network.

16. The method as claimed in claim 15, wherein the at least one remote node accesses a list of PSTN phone lines connected to a local PSTN switch, analyses a dialled number in a setup message from the mobile device and, if it matches an entry in the list of PSTN phone lines, switches the session through a local point of interconnection.

17. The method as claimed in claim 1, wherein the at least one remote node performs tagging to determine when to connect locally, by injecting an identifier in a signal and monitoring subsequent signals for the identifier, and the injection is in a signal from either the called device or the calling device.

18. The method as claimed in claim 1, where the devices have adaptive multi-rate codec capabilities, and local connection is performed using contents of a Tandem Free Operation report to indicate that both devices can use matching adaptive multi-rate codecs.

19. The method as claimed in claim 18, wherein the session is initially connected back to the network core nodes, codec matching is performed by manipulating inband signalling exchanged between nodes, and the at least one remote node locally connects the session after confirmation that the speech codecs on both radio links are identical.

20. The method as claimed in claim 1, wherein the at least one remote node modifies control information in frames exchanged between a BTS and the core network to switch from a voice session to a data session and to tag data with a special identifier to implement a tagging mechanism.

21. The method as claimed in claim 1, wherein at least some signalling information is stored in call records, wherein analysis of the call records is performed in a learning operation to establish a relationship between identifiers such as MSIDSNs and IMSIs, and subsequently this relationship is used to decide on local connection.

22. A non-transitory computer program medium comprising computer readable software code embodied therein, said code being adapted to perform a method of claim 1 when executing on a digital processor.

23. A mobile network comprising at least one remote node and a core network having nodes including switching elements, wherein said remote and network core nodes are adapted to communicate with each other via a backhaul communication link, and the network is adapted to perform a method comprising the steps of:

the at least one remote node allowing a mobile device registered with the at least one remote node to originate a voice or data session with a called device, the at least one remote node determining if the called device is local and, if so, connecting the session locally, the at least one remote node extracting, from signals, information concerning said devices to populate a database, and accessing said database when deciding whether to connect the call locally;

wherein said information includes device capability information including codec capabilities of the originating and terminating devices;

wherein the at least one remote node alters signalling information concerning codec capabilities of at least one of said devices to force use of the same codec during the session, and wherein the at least one remote node hands back the session to a network core node without switching it locally if it is not possible for the originating and terminating devices to use the same codec, wherein the at least one remote node performs a legal intercept by switching locally and copying session traffic back to the network core, and wherein the network core suppresses downstream traffic to the at least one remote node;

wherein said legal intercept operations are activated according to an instruction from a network core node.

24. A method of operation of a mobile network comprising a network core having nodes including a switching node, and at least one remote node linked with the network core via a remote backhaul communication link, the method comprising the steps of:

a mobile device registered with the at least one remote node originating a voice or data session with a called device, the at least one remote node determining if the called device is local and, if so, connecting the session locally, the at least one remote node extracting, from signals, information concerning said devices to populate a database, and accessing said database when deciding whether to connect the call locally;

wherein said information includes device capability information including codec capabilities of the originating and terminating devices;

the at least one remote node altering signalling information concerning codec capabilities of at least one of said devices to force use of the same codecs during the session, the at least one remote node handing back the session to said network core without switching it locally if it is not possible for the originating and terminating devices to use the same codec;

wherein if codec capabilities of the called device are a superset of the calling device, the Bearer Capability in a Call Confirmed message is changed to match the codec capabilities of the calling device, allowing a session to be locally connected without transcoding.

25. A method of operation of a mobile network comprising a network core having nodes including a switching node, and at least one remote node linked with the network core via a remote backhaul communication link, the method comprising the steps of:

a mobile device registered with the at least one remote node originating a voice or data session with a called device, the at least one remote node determining if the called device is local and, if so, connecting the session locally, the at least one remote node extracting, from signals, information concerning said devices to populate a database, and accessing said database when deciding whether to connect the call locally;

wherein said information includes device capability information including codec capabilities of the originating and terminating devices;

the at least one remote node altering signalling information concerning codec capabilities of at least one of said devices to force use of the same codecs during the session, the at least one remote node handing back the session to said network core without switching it locally if it is not possible for the originating and terminating devices to use the same codec; and wherein the devices have adaptive multi-rate codec capabilities, and local connection is performed using contents of a Tandem Free Operation report to indicate that both devices can use matching adaptive multi-rate codecs.

* * * * *

UNITED STATES PATENT AND TRADEMARK OFFICE
CERTIFICATE OF CORRECTION

PATENT NO. : 8,670,770 B2
APPLICATION NO. : 13/124238
DATED : March 11, 2014
INVENTOR(S) : Fitzgerald et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 304 days.

Signed and Sealed this
Twenty-ninth Day of September, 2015

Michelle K. Lee
*Director of the United States Patent and Trademark Office*